(No Model.)
G. SCHOENAU.
SHAVING MUG.
No. 295,436. Patented Mar. 18, 1884.
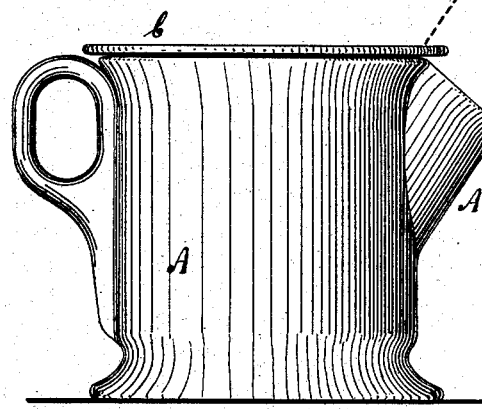
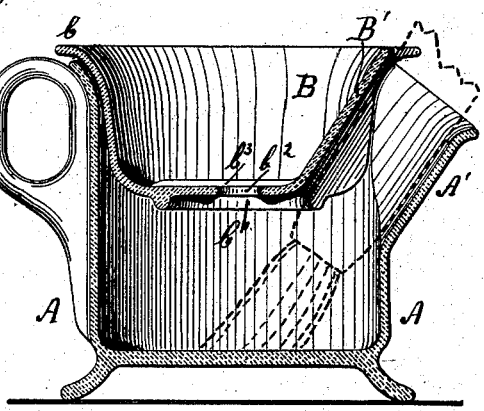
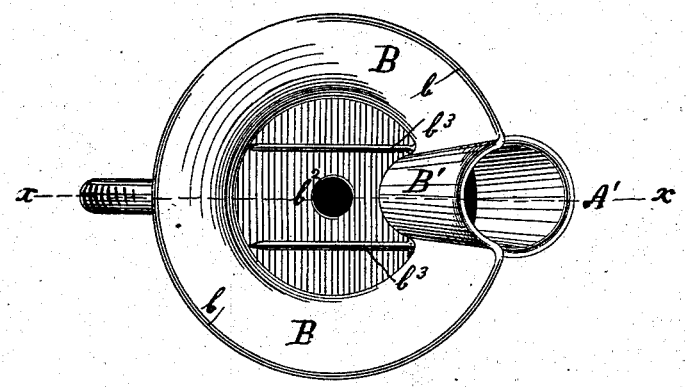
WITNESSES:
INVENTOR
Günther Schoenau
BY Goepel & Raegener
ATTORNEYS.

UNITED STATES PATENT OFFICE.

GÜNTHER SCHOENAN, OF HÜTTENSTEINACH, GERMANY.

SHAVING-MUG.

SPECIFICATION forming part of Letters Patent No. 295,436, dated March 18, 1884.

Application filed August 20, 1883. (No model.)

*To all whom it may concern:*

Be it known that I, GÜNTHER SCHOENAN, of Hüttensteinach, in the Empire of Germany, have invented certain new and useful Improvements in Shaving-Mugs, of which the following is a specification.

Heretofore in shaving-mugs the soap-dish was arranged inside of the cup by dividing it, by a vertical central partition, into two sections, one section for the water and the other for the soap. Shaving-mugs of this construction impede the movement of the brush and can accommodate but a small piece of soap, which latter is quickly used up, as the soap is always in a moist state. Furthermore, the cleaning of these cups is difficult, nor can they be used for any other except shaving purposes.

The object of this invention is to furnish a shaving-mug in which these inconveniences are obviated; and the invention consists of a cup having a spout and a handle of the usual form, and of a detachable soap-dish having an outwardly-bent circumferential flange, and a perforated bottom with raised ribs. The soap-dish is further provided with a convex inwardly-projecting side portion that forms, with the spout of the cup, a support for the shaving-brush.

In the accompanying drawings, Figure 1 represents a side view of my improved shaving-mug; and Figs. 2 and 3 represent, respectively, a vertical longitudinal section on line $x\,x$, Fig. 3, and a top view of the same.

Similar letters of reference indicate corresponding parts.

In the drawings, A represents a mug of a suitable size and material, which is provided at one side thereof with a handle, and at the opposite side thereof with a spout, A'. A detachable soap-dish, B, of cup shape, is supported by an outwardly-bent circumferential flange, $b$, on the edge of the mug A. The bottom of the soap-dish B is provided with a downwardly-projecting base-rim, $b'$, upon which the dish is supported when removed from the mug A. The bottom of the soap-dish B has one or more draining-holes, $b^2$, and raised parallel ribs $b^3$ at its upper surface. The ribs $b^3$ keep the soap above the water, which is drained off into the mug by the hole or holes $b^2$. At one side of the soap-dish a convex inwardly-projecting side portion, B', is arranged, which extends from the upper edge to the bottom of the soap-dish, and which forms, in connection with the spout A', a socket-shaped inclosure for the shaving-brush, as shown in Fig. 2.

The advantages of my invention are that a large piece of soap can be used, which is always kept perfectly dry, as the water is drained off. As the soap-dish is detachable, the dish and mug can be easily and thoroughly cleaned, and the mug itself used for other purposes in case the soap-dish should get broken or the mug not be desired any longer for shaving purposes.

I am well aware that shaving-mugs provided with inclined spout or nose, and a soap-receptacle made integral with the mug and provided with draining-passages in the side or bottom of the soap-receptacle, have been used heretofore; and I do not claim this feature. I am further aware that shaving-mugs with detachable soap-receptacles have also been used heretofore; and I therefore distinctly disclaim this feature. The essential feature of my improved shaving-mug consists of an inclined spout in the shaving-mug, and of a soap-dish provided with an inclined concavo-convex and inwardly-projecting portion, which, in connection with the spout, serves to hold the shaving-brush in position. By thus supporting the brush by the spout of the mug and the depression of the dish, the spout can be made much smaller, so as to take up less room on the shelves of the barbers.

Having thus described my invention, I claim as new and desire to secure by Letters Patent—

1. A shaving-mug composed of a mug having a spout, and of a detachable soap-dish supported by the mug and having a convex inwardly-projecting side portion adapted to hold the shaving-brush, in connection with the spout, substantially as set forth.

2. A shaving-mug composed of a cup-shaped mug having a spout, and of a detachable soap-dish having a circumferential supporting-flange, a ribbed and perforated bottom, and a convex inwardly-projecting side portion, substantially as specified.

3. In a shaving-mug, a detachable soap-dish having a convex inwardly-projecting side portion, substantially as set forth.

4. In a shaving-mug, a detachable soap-dish having a circumferential supporting-flange, a ribbed and perforated bottom, a base-rim, and a convex inwardly-projecting side portion, substantially as specified.

In testimony that I claim the foregoing as my invention I have signed my name in presence of two subscribing witnesses.

GÜNTHER SCHOENAN.

Witnesses:
HERMANN WALTHER,
HERMANN SCHRÖDER.